United States Patent

[11] 3,618,652

| [72] | Inventors | Kenneth D. Marshall<br>W. Richfield, Ohio;<br>John W. Melvin, Ann Arbor, Mich. |
|---|---|---|
| [21] | Appl. No. | 3,019 |
| [22] | Filed | Jan. 15, 1970 |
| [45] | Patented | Nov. 9, 1971 |
| [73] | Assignee | The B. F. Goodrich Company<br>New York, N.Y. |

[54] SHOCK ABSORBER
9 Claims, 8 Drawing Figs.

[52] U.S. Cl. .................................... 152/5,
152/DIG. 5
[51] Int. Cl. .................................... B60b 9/18
[50] Field of Search .................................... 152/5, 8,
11, 12, 330 W

[56] References Cited
FOREIGN PATENTS

| 1,180,870 | 1/1959 | France | 152/330 W |
| 928,790 | 6/1947 | France | 152/330 W |

Primary Examiner—Arthur L. La Point
Assistant Examiner—Sgd. D. W. Keen
Attorneys—W. A. Shira, Jr. and Harold S. Meyer ABSTRACT: A closed fluid-containing vessel subject to deflection in response to changes of load thereon, for example an inflatable vehicle tire, adapted to be filled with a substantially incompressible fluid, is rendered capable of absorbing impacts by having a distensible elastomeric tube mounted externally of the member and communicating with the interior thereof. The tube wall bulges to accommodate fluid displaced from the vessel upon deflection of the latter without substantial increase of fluid pressure above a preselected value.

INVENTORS
KENNETH D. MARSHALL
JOHN W. MELVIN
BY W. A. Shira, Jr.
ATTY.

INVENTORS
KENNETH D. MARSHALL
JOHN W. MELVIN
BY W. A. Shira Jr.
ATTY.

$\frac{V_B}{V_O} = 2.36 (T_O/R_O) + 3.01$

SHOCK ABSORBER

BACKGROUND OF THE INVENTION

In designing shock-absorbing systems, it is difficult to provide one having a high deflection response and one that will absorb loads of high impulse without exceeding the deflection response capability of the system. If, alternatively, a "stiff" shock-absorbing system is provided to withstand large-magnitude high-impulse loads, the system is generally insensitive to low-magnitude perturbations and deflections.

For example, certain types of off-the-road machinery, such as dirt loaders, graders, and farm tractors are commonly designed without a spring suspension system intermediate the wheels and the vehicle chassis. It is often desirable to fill the tires of such vehicles with a substantially incompressible fluid such as water. This is done to increase the vehicle weight and therefore provide increased traction for the lug-type tires used on soft surfaces on which the vehicle operates, such as mud and sand.

The use of water-filled tires provides vehicles of this type with a stiff suspension which is very rough riding and susceptible to a severe resonant bounce that occurs when the vehicle encounters bumps causing the vehicle motion, in a generally vertical direction, to reach a critical amount. The phenomenon of severe resonant bounce not only renders the vehicle difficult to control, but subjects the operator to severe shocks transmitted through the operator's seat. Furthermore, if the vehicle sustains this bouncing for several continuous vertical cycles, severe loads are placed on the rotating parts, for example the transmission, engine crank shafts and power shafts in the vehicle drive mechanism. Increased loads of this type often lead to premature failures of such parts as bearings, power transmission shafts, and gear teeth.

Numerous attempts have been made to provide damping systems for use in vehicles having very stiff suspensions and in particular those having tires filled with a substantially incompressible fluid. Some of these attempts have incorporated dampeners in the fluid-filled systems which permit the fluid in the tire to flow through a port to an expansion chamber where a force-assisted diaphragm exerts a resisting force thereon. Various mechanical expedients such as springs and pneumatic pressure have been employed to provide force assist and thereby control the expansion of the diaphragm. Other mechanical systems have been used in place of a diaphragm, but are generally unsuccessful. It has been extremely difficult in view of the size and complexity of the mechanical portions of the damping systems to incorporate these on a rotating wheel, and equally difficult to provide a fluid conduit, via a rotating coupling, to connect with the tire. Furthermore, even where these obstacles have been overcome, it has been difficult to provide the needed fluid pressure sensitivity in the mechanical system such that it is responsive to small-amplitude deflections and yet capable of absorbing high-impulse and high-amplitude deflections. Furthermore, the system must be capable of resisting the static inflation pressure of the fluid in the tire.

SUMMARY OF THE INVENTION

The present invention is hereinafter specifically described as it is embodied in a vehicle tire of cord-reinforced elastomeric material having a hollow chamber therein which is adapted to be filled with a substantially incompressible fluid. However, the invention is not limited to vehicle tires but is applicable generally to shock-absorbing systems utilizing the pressurization and movement of a substantially incompressible fluid to absorb kinetic energy.

In its simplest form illustrated, the invention comprises the combination of a tubeless, inflatable vehicle tire, mounted upon a fluidtight rim, and having a resiliently distensible elastomeric tube attached at its ends to the tire by means of spaced ports communicating with the chamber provided by the tire and rim so that the fluid in the tire is permitted to flow through the tube. Deflections of the tire cause additional fluid to flow from the tire into the tube which expands elastically an amount proportional to the pressure therein until the elastomeric tube attains a predetermined fluid pressure, whereupon the tube bulges elastically by expansion disproportional to the fluid pressure so that further resistance by the tube to fluid displacement is negligible until the fluid pressure is decreased below the predetermined value.

The above-described system provides a solution to the problem of absorbing shock on heavy vehicles having a rigid suspension and particularly those using liquid-filled tires. The elastomeric tube is designed to resist the static fluid pressure in the tires and to expand elastically, without excessive deflection, up to a fluid pressure which represents tire deflection associated with static pressurization and small rolling deflections under normal vehicle load. When severe vehicle suspension deflection is encountered or the wheels encounter bumps of sufficient magnitude to cause large tire deflection, the elastomeric tube bulges by a localized expansion disproportionate to the pressure thereby offering only slight resistance to the flow of additional fluid into the tube. This permits the tire, which would otherwise be quite rigid in view of the incompressible fluid, to sustain large deflections in which the energy associated therewith is absorbed by the damping system. When the large tire deflection is reduced, the fluid transferred to the elastomeric tube during deflection flows back into the tire and the bulging of the elastomeric tube ceases, with the tube thereafter continuing to respond by normal expansion in amounts proportional to the pressure therein, namely that due to the static inflation and small disturbances of the rolling tire.

The present invention thus provides a novel shock-absorbing system in which sudden and large magnitude deflections of a vessel, such as a vehicle tire, filled with a substantially incompressible fluid are absorbed as the result of fluid flowing into an interconnected elastomeric tube which bulges elastically and thereby more readily accepts the flow of additional fluid from the tire.

DETAILED DESCRIPTION

Figure 1:
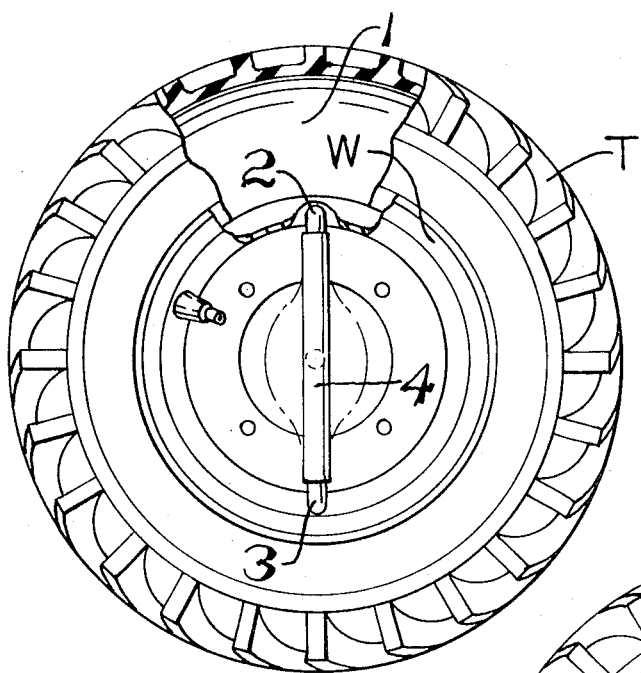
FIG. 1 is a side view of the embodiment of the invention in a wheel and tire with the bulged configuration of the distensible tube being shown in dashed lines.

Referring to FIG. 1, the invention is shown embodied in a rotatable wheel rim W with a tire T mounted thereon. The tire has a toroidal shape with hollow chamber 1 formed by the tire and wheel rim, the chamber being filled with a substantially incompressible fluid. A first fluid pressure port 2 is provided through the wheel rim W communicating with the fluid pressure chamber 1 within the tire. A second fluid pressure port 3 is provided through the rim, the said port being diametrically opposed to the first port and also communicating with the fluid pressure chamber 1 within the tire. An elastomeric shock-absorbing tube 4 is attached to the pressure ports having one end connected to the first port and the other end connected to the second port with each end forming a pressuretight seal. Initially, the tire and shock tube 4 are substantially filled with an incompressible fluid as, for example, water or any other inexpensive inert fluid, to a static pressure required to support the vehicle for normal rolling operation on a smooth surface. The elastomeric tube is designed, as hereinafter explained, so that it is at the onset of bulging when the inflated tire is subjected to deflection by the static vehicle weight while further deflections of the tire by dynamic loading thereof, through impacts or sudden deflections, cause the elastomeric tube to bulge and thus permit greater fluid transfer without any significant increase in the forces tending to inflate the tire or increase fluid pressure.

Figure 2:
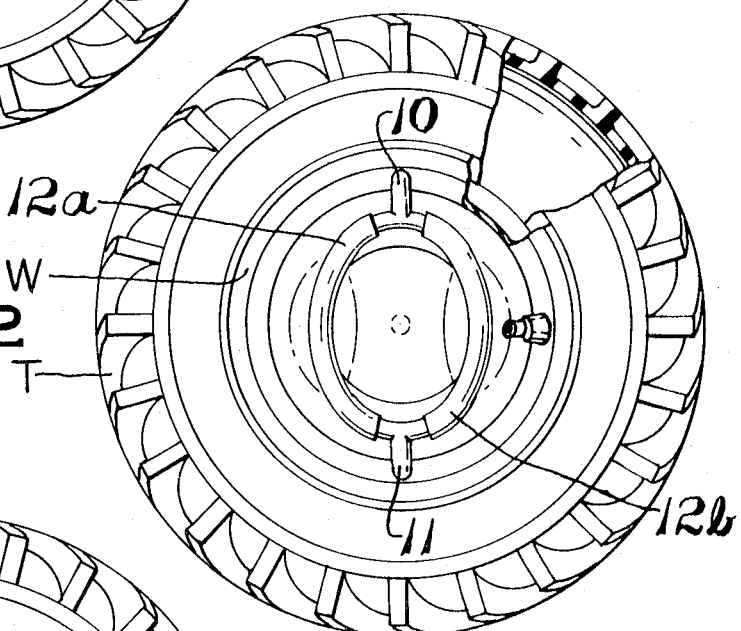
FIG. 2 is a view similar to FIG. 1 illustrating an alternate form of the embodiment of FIG. 1 incorporating two shock-absorbing tubes.

Referring now to FIG. 2, an alternative form of the embodiment of FIG. 1 is illustrated, wherein the tube means comprises two tubes, 12a and 12b. Two pressure ports 10 and 11 are disposed in diametrically opposed arrangement similar to the port arrangement in the embodiment of FIG. 1. The embodiment of FIG. 2 is employed where small wheel rims preclude use of the single shock-absorbing tube of the embodiment of FIG. 1 because the length required to provide the required internal volume increase for the single tube would necessarily be greater than the diameter of the wheel rim. Furthermore, the use of two tubes effectively doubles the length L of a single tube and enables smaller diameter tubes to be used for any given fluid volume requirement. The criteria for design of the tube for accepting a given fluid volume are determined separately as will be described in greater detail infra. It is desirable to use the longitudinally most flex-resistant, yet resiliently distensible tube possible in order to minimize unwanted radial and even axial motion of the tube due to the mass of water in the tube. Although two tubes 12a and 12b have been shown in FIG. 2, it should be noted that more than two tubes may be used.

Figure 3:
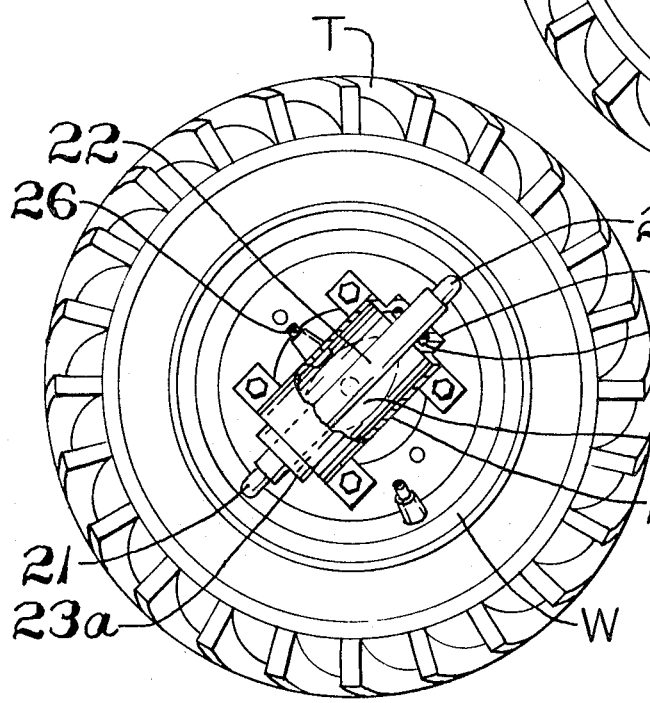
FIG. 3 is a view similar to FIG. 1 illustrating the presently preferred embodiment as incorporating a housing surrounding the tube and thereby providing a second fluid pressure chamber for preloading the shock-absorbing tube.

Referring now to FIG. 3, the preferred embodiment of the invention is shown wherein an inflatable tire T is mounted on wheel rim W having diametrically spaced ports 20 and 21 communicating through the rim into the inflation chamber between the tire and rim similar to the embodiment of FIG. 1. An elastomeric shock-absorbing tube 22 is provided and the tube has each end connected to one of the pressure ports 20 and 21 similar to the embodiment of FIG. 1, such that inflating fluid from the tire passes through the ports 20 and 21 into the elastomeric tube 22. When the tire T is subjected to large deflections, additional fluid flows into the tube 22 causing the tube to bulge, similar to the tube in the embodiment of FIG. 1, and as indicated by the dashed lines in FIG. 3.

A rigid housing 23 is disposed about the outer periphery of the tube 22 in concentric relationship thereto having the end portions of the housing 23a terminating in fluid pressure-sealing arrangement over the hose 22 adjacent the ports 20 and 21. Each end of the housing has a recess, or groove, formed therein for receiving a separate seal 24 for providing fluid pressuretight sealing between the ends of the housing 23 and the outer periphery of tube 22. The housing 23 is of generally thin wall construction and forms a hollow fluid pressure-sealed chamber 25 between the inner periphery of the housing and the outer periphery of the shock-absorbing tube 22.

A pressure supply valve 26 is provided through the wall of the housing 23 communicating with the chamber 25 within the housing. The valve 26 permits the introduction of a compressible inflating fluid under pressure into the chamber 25 for providing a pressure preload externally on the elastomeric tube 22. Where high-static tire pressures are required, addition of pressurized fluids into the housing 23, through valve 26, reduces the net differential pressure across the wall of tube 22, thereby delaying the onset of bulge in tube. This technique enables tube 22 of a thin wall, which is highly sensitive to small fluid pressure changes, to be employed while permitting the tire to be pressurized to a sufficient static pressure to support the vehicle weight, thus providing a high degree of deflection sensitivity to a suspension that supports a heavy vehicle.

Figure 5:
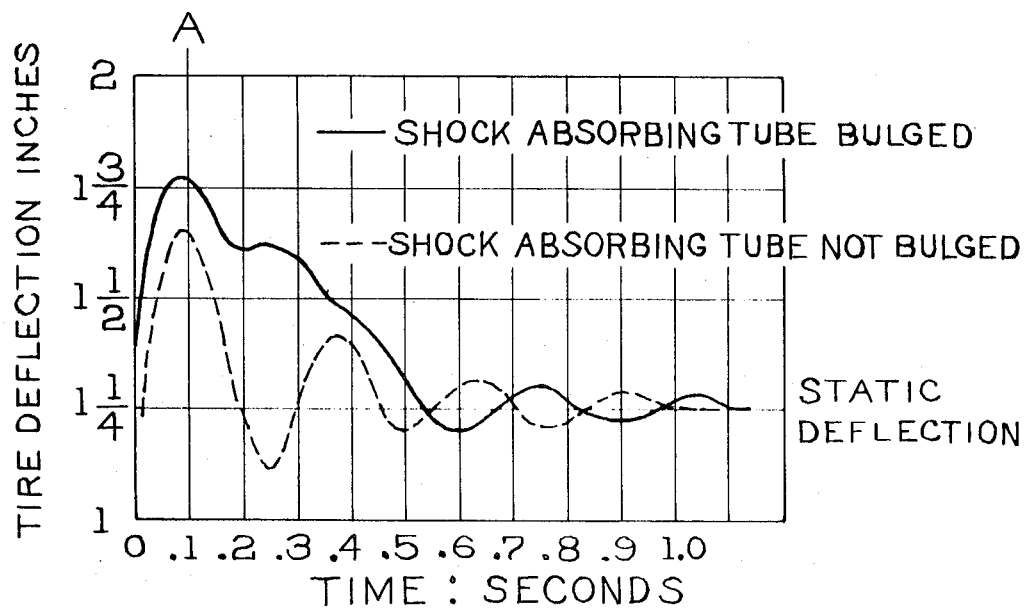
FIG. 5 is a graph of tire deflection plotted against time for the impulse condition of FIG. 4 with the plot of deflection sufficient to cause bulging shown in solid line and the plot of deflection insufficient to cause bulging shown in dashed line.
Figure 4:
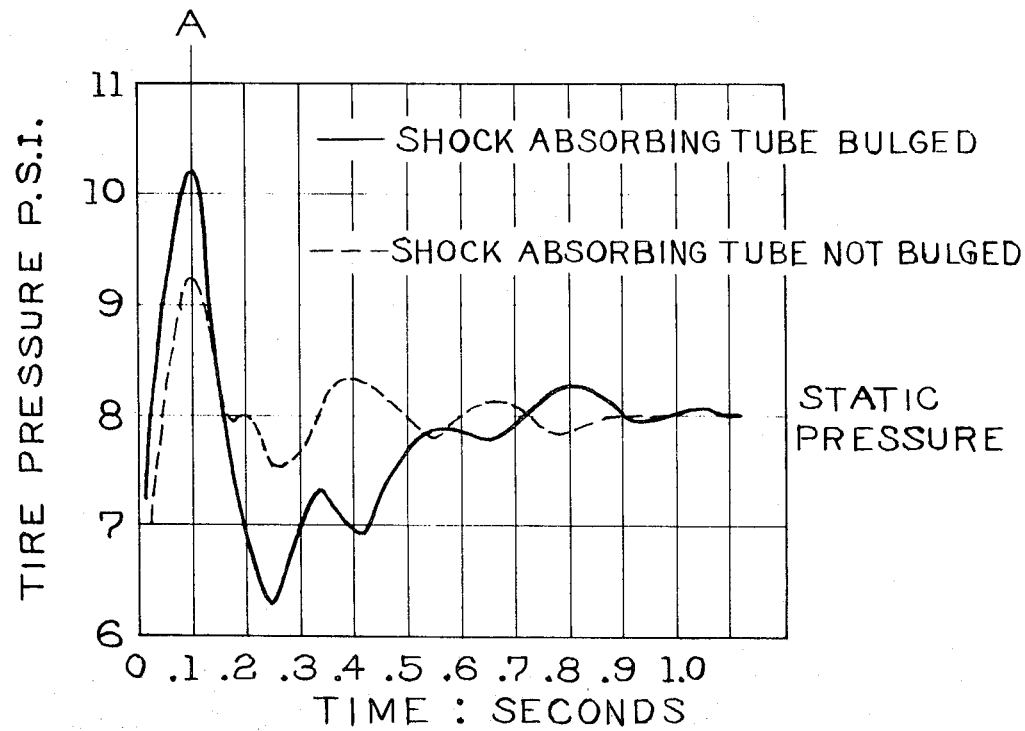
FIG. 4 is a graph of fluid pressure plotted against time for the shock-absorbing tube of FIG. 2 deflected by high-impulse loading with the parameters for tire deflection sufficient to cause the tube to bulge being shown by the solid line and the parameters for deflection insufficient to cause bulging being shown by a dashed line.

Referring now to FIGS. 4 and 5, the operation of the present shock absorber is illustrated by graphs of tire deflection and tire pressure plotted as traces in time for a water-filled passenger car tire of 8.25-14 size inflated to 8 p.s.i. static pressure. The graphs are traces for a system employing a shock-absorbing tube arranged in the form of embodiment illustrated in FIG. 2.

The curves in FIG. 4 were obtained from a tire that was mounted on a rim free to rotate about an axle mounted near one end of a weighted cantilevered boom. The boom was pivoted about the opposite cantilevered end and was free to move vertically, with the weight of the boom urging the tire into contact against the surface of a conventional test road wheel running at a speed of 4 miles per hour. The boom was weighted to give 420 lbs. of axle load to the tire. A pressure transducer was installed through the wheel rim to indicated water pressure in the tire and a deflection transducer was provided to measure the vertical motion of the tire axle with respect to the axis of the road wheel. The electrical signals from the transducers were remotely applied to a continuous recording oscillograph and the traces are reproduced, in part, as FIGS. 4 and 5.

When the tire and boom were externally disturbed from the smooth running state of essentially static deflection by "bouncing" the weighted boom, by an amount not sufficient to bulge the shock-absorbing tube, the system behaved similar to an undamped water-filled tire as shown by the dashed line traces of FIGS. 4 and 5. The time position of occurrence of the external disturbance of "bounce" is marked by the block letter A in FIGS. 4 and 5. When the tire was "bounced" an amount sufficient to cause bulging of the shock-absorbing tube, the system behaved as shown by the solid line traces of FIGS. 4 and 5. From these latter solid line traces, it can readily be seen that the bulged-tube shock-absorbing system provides nearly critical damping of the system, i.e. only slightly more than one complete cycle of deflection and pressure occurs before the system returns to substantially steady state running conditions.

The presently preferred procedure for designing a tube for the shock absorber having a single tube is as follows.

Tensile tests are performed on a sample of the material from which the tube is to be made and the extension functions obtained from the resultant test data. In order to do this, values of tensile stress $\sigma$ are determined from experimentally measured loads, and corresponding values of extension ratio $\lambda$ are determined from measured strains, corresponding to the measure loads, using the relationship $\lambda = 1 + \gamma$ where $\gamma$ is the measured strain. Having determined values of $\sigma$ and $\lambda$, values of the parameters $$\Phi_1 = \frac{\sigma}{(\lambda - 1/\lambda^2)}, \text{ and } \Phi_2 = \frac{(2\lambda + 1)}{(\lambda^3 + \lambda^2 + \lambda)}$$

are computed and a graph is plotted with values of $\Phi_1$ as ordinates and values of $\Phi_2$ as abscissae from which the basic material property constants $2D_1$ and $2D_2$ are determined since $2D_1$ is the ordinate intercept and $2D_2$ is the slope of the line graph.

Theoretically, the constants $2D_1$ and $2D_2$ should be related such that $D_2/D_1 = 0$. However, test data indicate a correction factor Y, known as a "shift factor," must be introduced. The value of Y is determined from the equation:

(1) $Y = 1 + 0.8598(D_2/D_1) - 0.1004(D_2/D_1)^2$.

The value of $Y$ is then employed with the value of the maximum permissible pressure in the deflected tire and tube, denoted $P_{max}$, to establish the value of the term $\rho$ which is defined as (2) $\rho \equiv P_{max}/2D_1Y$ It has been determined that the relationship between $T_0/R_0$ and $\rho$ is: (3) $T_0/R_0 = -1.3922 - 1.3876e^\rho + 0.4342\rho^2$ where $e$ is the logarithmic constant 2.71828. Hence, by substitution in this equation, the thickness ratio $T_0/R_0$ may be found for any desired maximum bulge pressure $P_{max}$.

The location where the tube is to be placed will normally determined its maximum length, $L$. This value substituted in the well-known formula $V_0 = 2\pi R_0^2 L$ for the volume of a cylinder provides the required internal radius of the tube. The thickness, $TK_0$, is then determined from the previously ascertained value of the ratio $T_0/R_0$.

Figure 7:
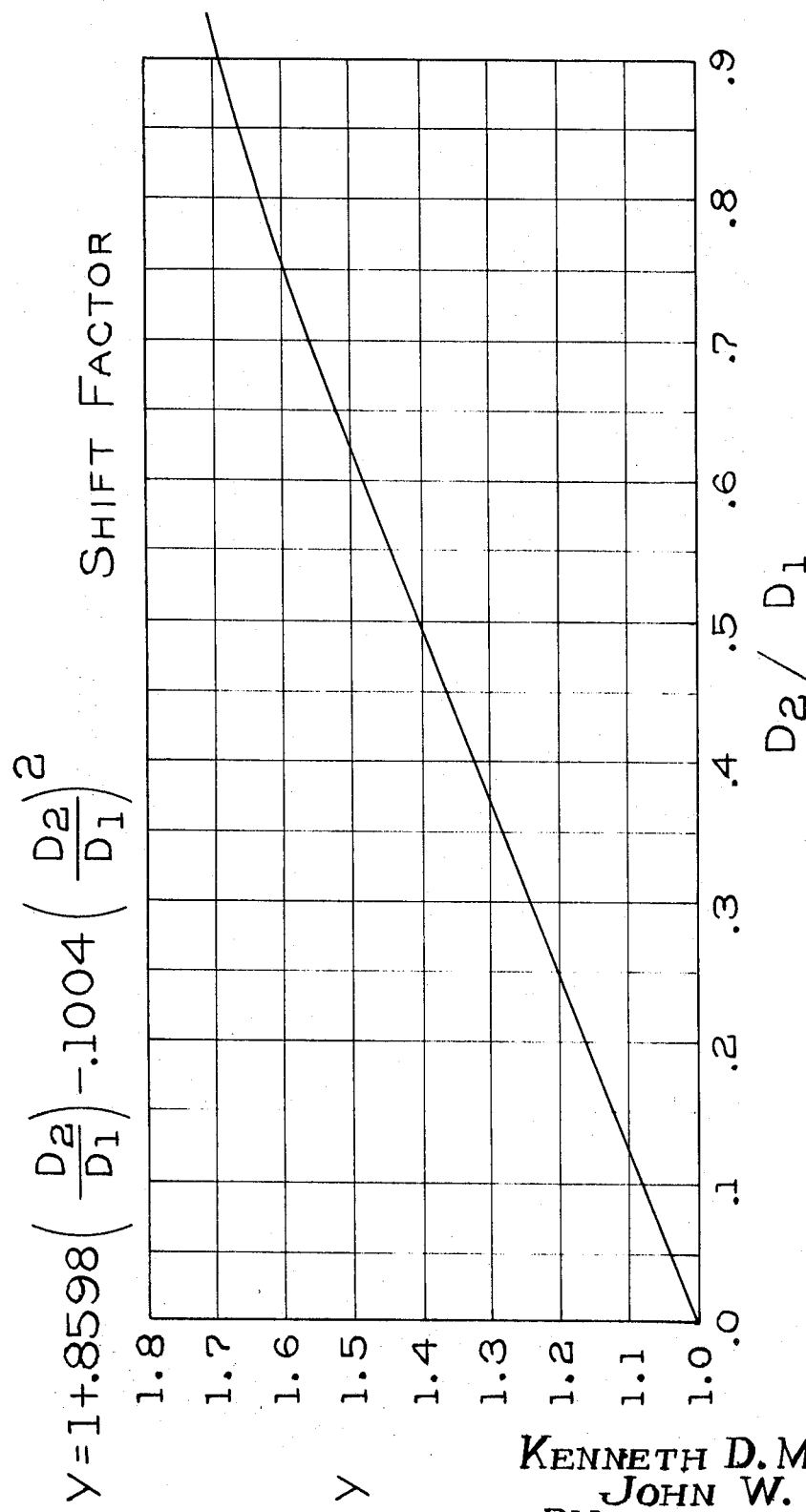
FIG. 7 is a graph of shift factor Y versus the ratio of material constants $2D_2/2D_1$.
Figure 8:
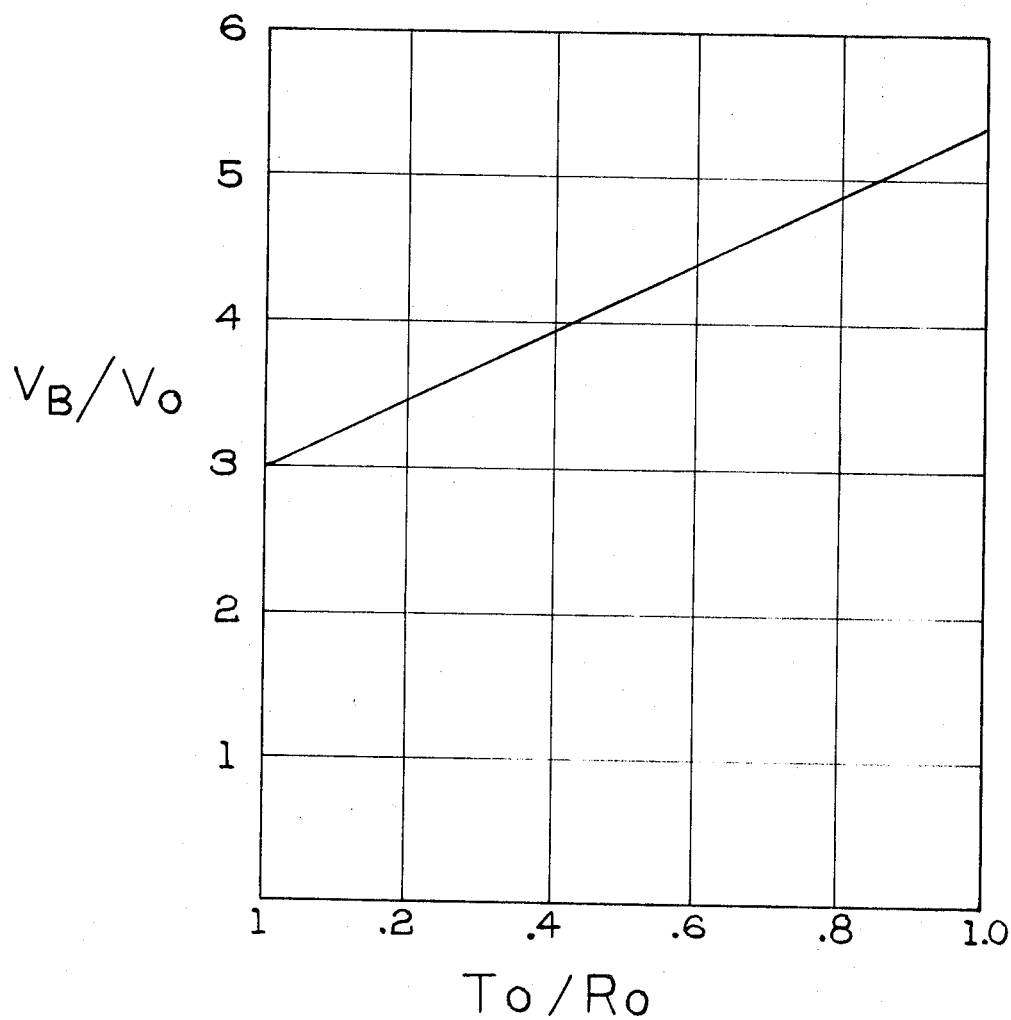
FIG. 8 is a graph of tube volume ratio $V_B/V_o$ versus tube thickness ratio $T_o/R_o$.

The required determination of the values of $V_0$, $T_0$, and $R_0$ may be facilitated by preparation of appropriate graphs. Thus, in FIG. 7 values of $Y$, in the preferred range 1.0–1.7, have been plotted against the corresponding values of $D_2/D_1$ in the preferred range 0–0.95. Hence, having determined the values of the material constants $D_1$ and $D_2$ from the tensile test data, the shift factor $Y$ may be determined by entering the graph of FIG. 7 for the particular value of $D_2/D_1$ and reading the corresponding value of $Y$. Similarly, in FIG. 6, a graph of values of $T_0/R_0$ and $\rho$ satisfying equation (3) has been plotted with values of $T_0/R_0$ as ordinates versus values of $\rho$ as abscissae. Hence, having determined the value of $\rho$, the graph of FIG. 6 may be entered to find the corresponding value of tube thickness ratio $T_0/R_0$. Likewise, the ratio $V_B/V_0$ can be determined from a graph such as FIG. 8 after the ratio $T_0/R_0$ has been ascertained.

Figure 6:
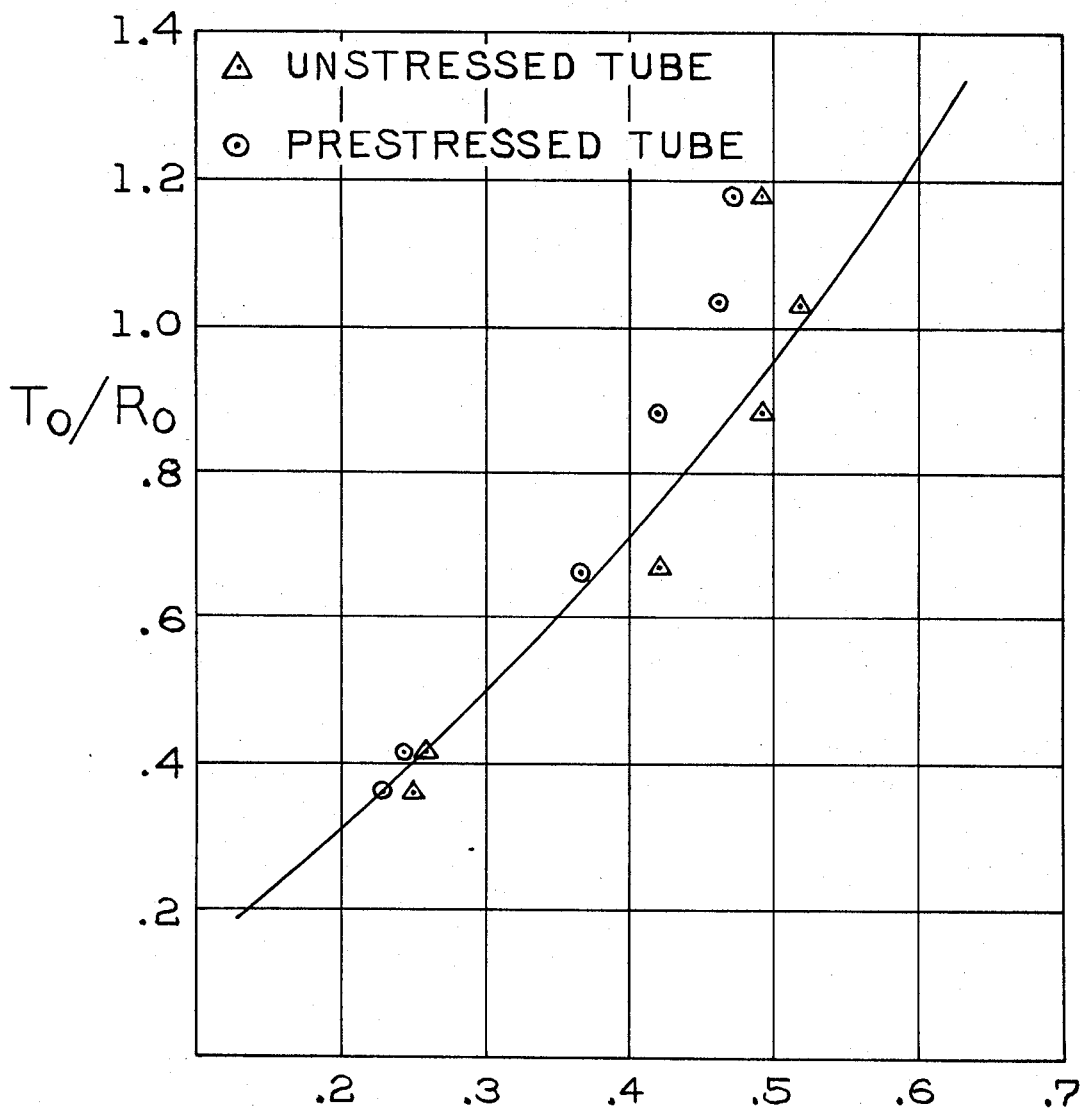
FIG. 6 is a graph for different values of tube thickness ratio, $T_o/R_o$, plotted as ordinates versus values of normalized bulge pressure $P_{max}/2D_1y$, plotted as abscissae using a theoretical relationship between $T_o/R_o$ and $P_{max}/2D_1Y$ with experimentally determined values of bulge pressure $P_{max}/2D_1Y$, plotted thereon to verify the theoretical curve.

The validity of equation (3) is verified by the agreement between the plotted points, representing experimentally determined values of $P_{max}$, $T_0$ and $R_0$ for sample rubber tubes and the theoretically determined curve. The test points in FIG. 6, plotted as triangles, are for values of bulge pressure $P_{max}$ measured for tube pressurization tests where a tube was bulged after having been in the stress-relaxed condition. The test points plotted as circles in FIG. 6 represent measured values of bulge pressure $P_{max}$ after repeated pressure cycling in which the sample tubes were not allowed sufficient time to stress relax before the test cycle. Six samples, each of commercially available laboratory tubing of natural rubber, having specific gravity ranging from 0.924–0.935 with an average of 0.929, were tested and the measurements of the tubes and test data are set forth in the following table. Each of the tubing samples tested was of the order of 10 feet long to minimize end effects. Sample number five, the thickest walled tube, had an initial kink or manufactured defect causing the tube to bulge at the kink which is attributed as the cause for the wide deviation of the measured value for this sample from the theoretically predicted values presented by the curve of FIG. 6.

BULGE PRESSURE TESTS OF NATURAL RUBBER TUBES

| Sample No. | Nominal size (inches) | Inner radius $t_0$ (in.) | $t_0/R_0$ | $P_{max.}$ (p.s.i.) Unstressed | $P_{max.}$ (p.s.i.) Prebulged | $2D_1$ | $\frac{2D_2}{2D_1}$ |
|---|---|---|---|---|---|---|---|
| 1 | 5/16×3/32 | 0.155 | 0.664 | 30.5 | 27.2 | 49.5 | .545 |
| 2 | 3/8×1/16 | 0.187 | 0.358 | 18.4 | 17.0 | 48.0 | .660 |
| 3 | 5/16×1/16 | 0.154 | 0.407 | 18.5 | 17.2 | 45.4 | .745 |
| 4 | 1/4×3/32 | 0.119 | 0.882 | 32.2 | 29.5 | 45.2 | .564 |
| 5 | 3/16×3/32 | 0.0831 | 1.190 | 37.8 | 33.5 | 55.5 | .471 |
| 6 | 1/8×1/16 | 0.0609 | 1.035 | 35.0 | 32.2 | 40.7 | .835 |

In the above description, the determination of the proper tube size indicated that the length thereof would be established by the environment in which it is placed. However, if this should not be the case then a value of the inner radius $R_0$ is selected and the wall thickness determined from the thickness ratio $T_0/R_0$ which will give the desired bulge ratio. The length of the tube required is then computed to give the necessary minimum initial volume $V_0$. If the thus-determined tube length is prohibitive for the particular wheel application, a new value of $R_0$ may be selected and the procedure repeated until the required length is within the limits set for the wheel on which the shock absorber is to be used. Although several values of $R_0$ may be selected, before the tube length is within the desired limits, and yet provides the appropriate minimum initial volume $V_0$, it should be emphasized that the previously determined thickness ratio $T_0/R_0$ is not changed. When $R_0$ has finally been established, a new corresponding value of tube thickness $T_0$ is determined from the thickness ratio.

The present invention thus provides a unique shock absorber employing an elastomeric tube which bulges locally disproportionately to the pressure therein so as to give substantially critical dampening to a system which is used to absorb fluid transferred from a liquid-filled deformable article, such as a tire on a stiffly suspended wheeled vehicle.

Although the invention has been described as having both ends of the bulging tube communicating with the tire or other deformable chamber, it will be apparent that only one end of the tube need so communicate and the other end thereof may be closed. These and other adaptations and modifications of the invention will be apparent to those having ordinary skill in the art and, hence, the invention is limited only by the spirit and scope of the following claims.

We claim:

1. A shock absorbing system comprising:
   a. a closed vessel substantially filled with substantially incompressible fluid and subject to changes of volume as a result of impact loads thereon; and,
   b. a hollow tube of elastomer also substantially filled with said fluid in unrestricted communication with the interior of said vessel such that free transfer of said fluid is permitted between the vessel and tube, the wall of said tube being elastically distensible upon receipt therein of a fluid volume in excess of the undistended volume of the tube with the tube wall having a thickness such that distension of the tube in excess of a preselected value is disproportionate to the fluid pressure therein.

2. The device defined in claim 1, wherein the ratio $V_B/V_0$ of bulged volume to initial volume of tube is determined, for any desired fluid volume acceptance $\Delta V$ at bulge, by the equation $(V_B/V_0) = 2.36(T_0/R_0) + 3.01$ where $V_B = V_0 + \Delta V$ 3. The shock-absorbing system defined in claim 1, wherein said fluid vessel is formed of flexible material having a toroidal shape and adapted to be rotatably mounted.

4. The shock absorber defined in claim 1, wherein said fluid vessel comprises a vehicle tire of elastomeric material mounted on a wheel rim such that a fluid-containing chamber is formed between the tire and rim.

5. The system defined in claim 1, wherein said vessel has a pair of spaced ports and the opposite ends of said tube are each respectively connected to one of said ports.

6. The system defined in claim 1, further comprising:
   a. a rigid housing surrounding said tube;
   b. means providing fluid pressure sealing between said housing and said tube such that a second chamber is formed between the outer surface of said tube and the inner periphery of said housing; and
   c. valve means communicating through said housing with said second chamber such that a compressible fluid may be introduced therethrough externally of said tube for varying the predetermined value of pressure at which said tube bulges.

7. The system defined in claim 1, wherein for any desired predetermined bulge pressure $P_{max}$, said tube has a ratio $T_0/R_0$, of wall thickness to internal radius as determined from the equation $$T_0/R_o = 1.392 + 1.387 e_\rho + 0.434 \rho^2,$$

where
$\rho \equiv P_{max}/2D_1Y$,
$e$ is the logarithmic constant, and
$Y$ is determined from the equation $$Y = 1 + 0.8598(D_2/D_1) - 0.1004 (D_2/D_1)^2,$$

wherein $2D_1$ is the ordinate intercept of a graph of the values of the parameters $$\frac{\sigma}{\lambda - 1/\lambda^2} \text{ and } \frac{2\lambda + 1}{\lambda^3 + \lambda^2 + \lambda}$$

and $2D_2$ is the slope of the said graph where $\sigma$ is the tensile stress and $\lambda$ is the extension coefficient of the elastomer as determined from tensile tests upon the elastomeric material to be used in the tube.

8. The combination of a vehicle wheel rim and an inflatable tire mounted thereon with said rim and tire providing an inflation chamber interiorly thereof, the said rim being provided with a pair of spaced ports, a hollow tube of elastomer externally of said chamber with the ends of said tube connected to said ports for unrestrained communication of the interiors of said tube and chamber, and means to introduce a substantially incompressible inflating medium into said chamber and tube, the said tube being elastically distensible by bulging disproportionately to the fluid pressure exerted thereon by receipt therein of inflating medium in excess of the undistended internal volume of the tube with the undistended volume and wall thickness of the tube selected such that bulging occurs when the said tire is subjected to deflections in excess of a predetermined amount.

9. The combination defined in claim 8, wherein for any desired predetermined bulge pressure $P_{max}$, said tube has a ratio $T_0/R_0$ or wall thickness to internal radius as determined from the equation $$T_0/R_o = 1.392 + 1.387 e_\rho + 0.434 \rho^2$$

where $\rho \equiv P_{max}/2D_1Y$, $e$ is the logarithmic constant, and $Y$ is determined from the equation $Y = 1 + 0.8598(D_2/D_1) - 0.1004(D_2/D_1)^2$, wherein $2D_1$ is the ordinate intercept of a graph of the values of the parameters $$\frac{\sigma}{\lambda - 1/\lambda^2} \text{ and } \frac{2\lambda + 1}{\lambda^3 + \lambda^2 + \lambda}$$

and $2D_2$ is the slope of the said graph where $\sigma$ is the tensile stress and $\lambda$ is the extension coefficient of the elastomer as determined from tensile tests upon the elastomeric material to be used in the tube.

* * * * *

UNITED STATES PATENT OFFICE
CERTIFICATE OF CORRECTION

Patent No. 3,618,652      Dated November 9, 1971

Inventor(s) Kenneth D. Marshall and John W. Melvin

It is certified that error appears in the above-identified patent and that said Letters Patent are hereby corrected as shown below:

Column 5, line 10, that portion of the formula reading "$-1.3876e^{\circ}$" should read --- $+1.3876e^{n}$ ---. Column 7, line 5, that portion of the formula reading "1.392" should read --- -1.392 ---. Column 7, line 5, that portion of the formula reading "$1.387e_{n}$" should read --- $1.387e^{n}$ ---. Column 8, line 11, change "or" to ---of---. Column 8, line 13, that portion of the formula reading "1.392" should read --- -1.392 ---. Column 8, line 13, that portion of the formula reading "$1.387e_{n}$" should read --- $1.387e^{n}$ ---.

Signed and sealed this 2nd day of January 1973.

(SEAL)
Attest:

EDWARD M. FLETCHER, JR.
Attesting Officer

ROBERT GOTTSCHALK
Commissioner of Patents